(12) United States Patent
Bonaventura

(10) Patent No.: US 6,547,475 B2
(45) Date of Patent: Apr. 15, 2003

(54) ANTI-THEFT SECURING DEVICE AND MICROSCOPE HAVING REMOVABLE BODY PART ANTI-THEFT PROTECTED

(75) Inventor: Russell Bonaventura, Colden, NY (US)

(73) Assignee: Leica Microsystems, Inc., Depew, NY (US)

( * ) Notice: Subject to any disclaimer, the term of this patent is extended or adjusted under 35 U.S.C. 154(b) by 0 days.

(21) Appl. No.: 09/951,567

(22) Filed: Sep. 12, 2001

(65) Prior Publication Data

US 2003/0049074 A1 Mar. 13, 2003

(51) Int. Cl.[7] ................................................. B25G 3/00
(52) U.S. Cl. ....................... 403/315; 403/316; 403/362; 411/910
(58) Field of Search ............................. 403/362, 374.3, 403/315–318, 320; 411/352, 353, 552, 553, 551, 910, 393; 292/175, 60–62, 256.71, 256.73

(56) References Cited

U.S. PATENT DOCUMENTS

| 3,130,994 A | * | 4/1964 | Balducci | ...................... | 403/20 |
| 3,259,012 A | * | 7/1966 | Locquin | ...................... | 359/383 |
| 3,476,349 A | * | 11/1969 | Smith | ........................ | 248/746 |
| 4,300,271 A | | 11/1981 | Wohlhaupter | ...................... | 29/1 |
| 4,862,624 A | | 9/1989 | Williams | ...................... | 42/101 |
| 4,919,459 A | * | 4/1990 | Miller | ........................ | 285/140 |

OTHER PUBLICATIONS

Grainger Catalog, Machining: Milling, Drilling & Tapping, p. 1518.
McMaster–Carr Catalog, Ball & Spring Plungers, p. 1799.

* cited by examiner

Primary Examiner—Lynne H. Browne
Assistant Examiner—Michael P. Ferguson
(74) Attorney, Agent, or Firm—Simpson & Simpson, PLLC

(57) ABSTRACT

An anti-theft device secures a removable body part, such as a viewing unit, to a microscope stand. The device is intended to replace a common thumbscrew used to fix the location of a removable body part in a corresponding guide of the microscope stand, and comprises a housing threaded into a tapped hole in the stand for carrying a plunger and a driver both movable within an axial passageway in the housing. The driver is threadably adjustable by hand between driving and non-driving positions with respect to the plunger, and the plunger has a limited range of motion so that it may retract enough to allow the removable body part to be adjusted within the guide but not enough to allow the body part to be removed from the guide when the driver is in a non-driving position. The housing is tightened onto the microscope body by a tool such as a wrench, and the driver is held captive by a snap ring fitting within an internal groove near a trailing end of the housing.

19 Claims, 4 Drawing Sheets

ANTI-THEFT SECURING DEVICE AND MICROSCOPE HAVING REMOVABLE BODY PART ANTI-THEFT PROTECTED

BACKGROUND OF THE INVENTION

I. Field of the Invention

The present invention relates to anti-theft fasteners and securing devices, and more particularly to an anti-theft device adapted for use in securing a removable body part on a microscope stand to prevent theft of the removable body part.

II. Description of the Related Art

Microscopes used at universities, hospitals, and other research facilities are typically configured in modular fashion, whereby a removable body part is mounted on the microscope stand. A common removable body part is a viewing unit such as a binocular viewing unit, a bridge viewing unit for allowing more than one observer, or a camera viewing unit. In established modular microscope designs, the stand is provided with a guide for locating the removable body part on the stand, and a common thumbscrew is threaded by hand through the guide portion of the stand to engage a portion of the removable body part to fix the body part in a selected position. In the case of a viewing unit, an annular dovetail is typically provided at the base of the viewing unit and a corresponding annular dovetail guide is provided on the top of the microscope stand; a tapped hole for a thumbscrew extends radially through the dovetail guide of the stand. Accordingly, the viewing unit can be rotated about an optical axis of the microscope and then secured in a selected rotational position by a thumbscrew tightened radially inward to engage the dovetail of the viewing unit. As an alternative to using a common thumbscrew having no moving parts, it is also known to use a thumbscrew incorporating a spring-biased ball plunger.

Two main drawbacks are recognized with respect to the prior art mentioned above. First, it is possible for a user to loosen the thumbscrew and completely remove the viewing unit or other removable body part from the stand, a situation that has enabled widespread theft of these expensive and vital microscope parts. Second, the thumbscrews can be completely unscrewed and removed from the tapped hole in the microscope stand, resulting in inadvertent loss of such thumbscrews.

BRIEF SUMMARY OF THE INVENTION

Therefore, it is an object of the present invention to provide a securing device that prevents theft of removable microscope body parts.

It is another object of the present invention to provide a securing device that prevents theft of removable microscope body parts while being operable in a simple manner without a tool between a partial release state that allows a user to adjust the position of the removable body part and a locking state that fixes the position of the removable body part.

It is yet another object of the present invention to provide a securing device that remains completely with the microscope body to prevent loss of the device.

It is yet another object of the present invention to meet the above objects with a simple and inexpensive device.

In furtherance of these and other objects, an anti-theft device formed in accordance with the present invention comprises a tubular housing threaded at its leading end for mating with a tapped hole in mounting guide means of a microscope stand, a plunger received by an axial passageway in the housing and movable in extension and retraction directions within a limited range, and a driver partially received within the passageway to extend from a trailing end of the housing. The driver includes an enlarged externally threaded portion sized for mating with an internally threaded portion of the housing, such that the driver can be threadably advanced to abut with the plunger to prevent motion of the plunger in its retraction direction. Alternatively, the driver can be unscrewed so as to allow the plunger to move in its retraction direction. A snap ring is provided near the trailing end of the housing to prevent complete withdrawal of the driver from within the housing passageway.

The housing is threaded into the tapped hole and tightened using a tool, such as a wrench, for which the housing is adapted. An enlarged head on the driver enables a user to threadably advance the driver by hand such that the driver pushes the plunger against a portion of the removable body part to securely fix the removable body part's position, or to withdraw the driver in an opposite direction until threaded mating is disengaged and the driver spins freely, whereby the plunger can travel slightly in its retraction direction so as to enable the removable body part to be adjusted within the guide but not completely removed from the guide. To remove the device, the tool must be used to loosen the device housing from the tapped hole in the microscope stand.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
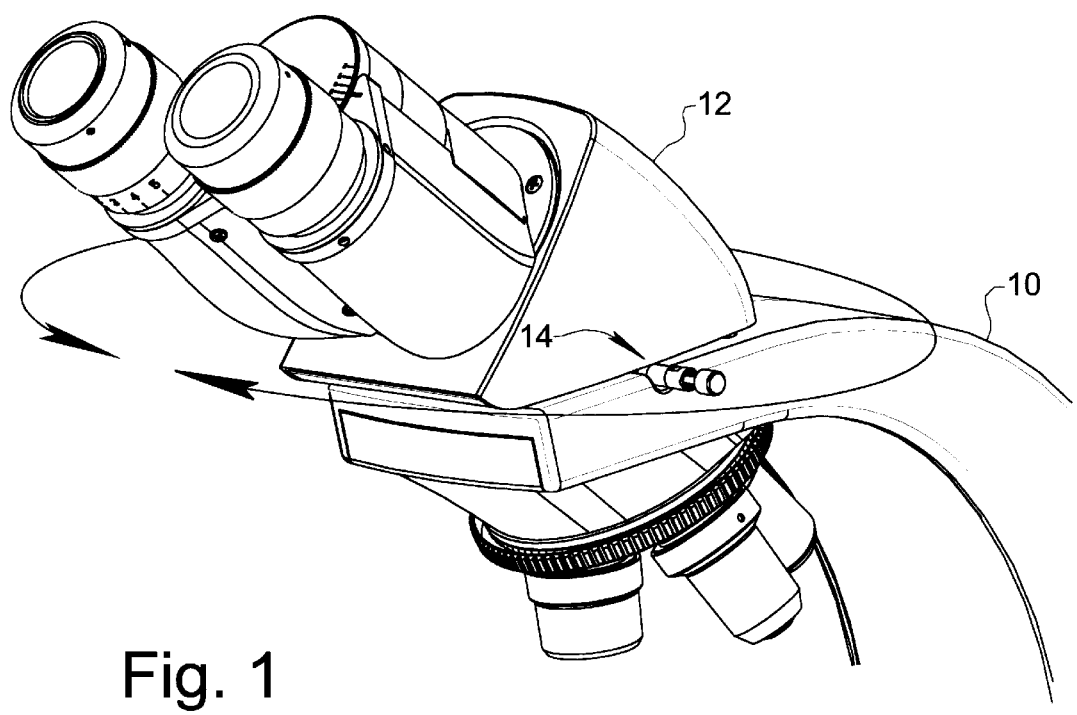
FIG. 1 is a perspective view showing a microscope incorporating an anti-theft device of the present invention.

FIG. 1 shows a microscope stand 10 and a binocular viewing unit 12 removably mounted on the microscope stand and held in place by an anti-theft device 14 formed in accordance with the present invention. Binocular viewing unit 12 is chosen as an example of a removable body part for a microscope for sake of illustrating and describing the present invention. Of course, other removable microscope body parts are also possible, including but not limited to other types of viewing units mentioned in the Background above.

Figure 2:
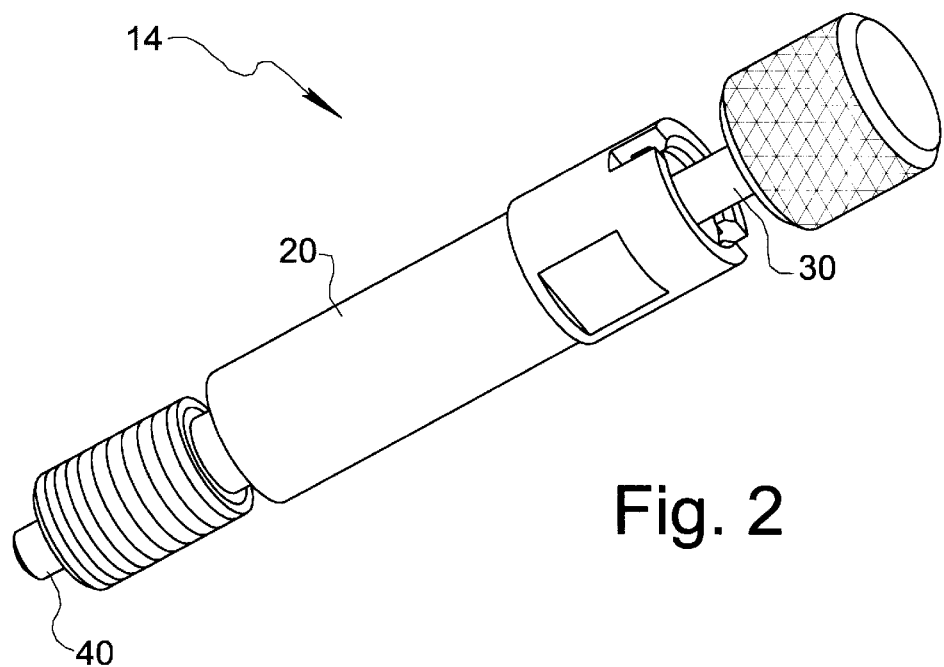
FIG. 2 is an enlarged perspective view of the anti-theft device shown in FIG. 1.
Figure 3:
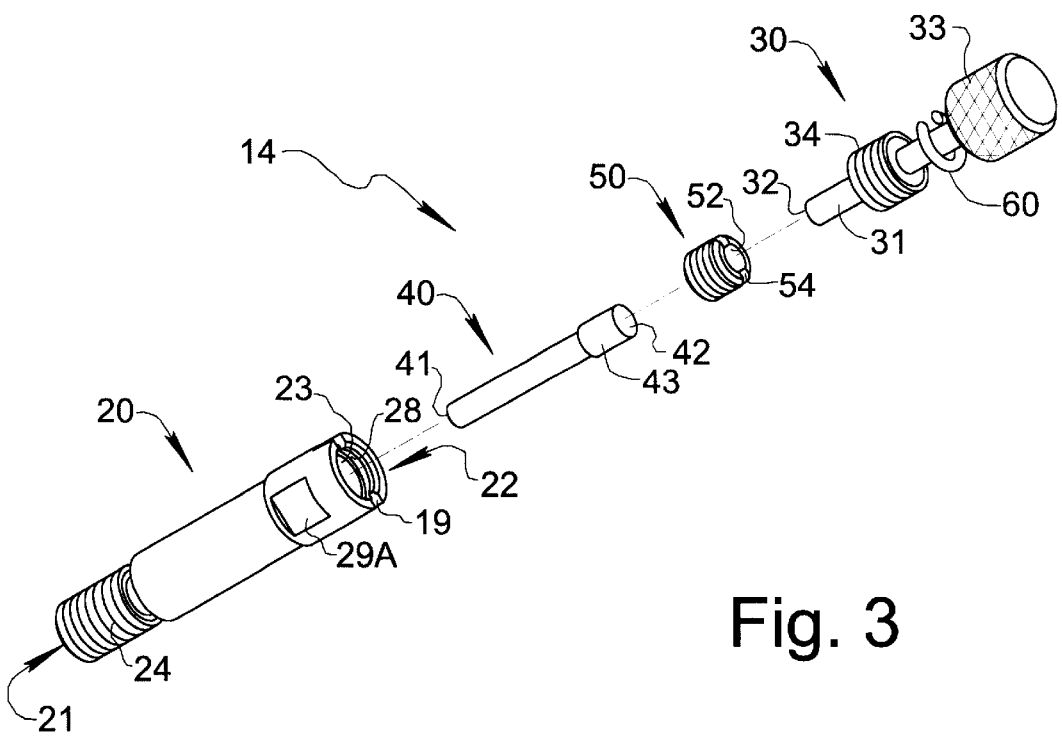
FIG. 3 is an enlarged, exploded perspective view of the anti-theft device shown in FIGS. 1 and 2.
Figure 4:
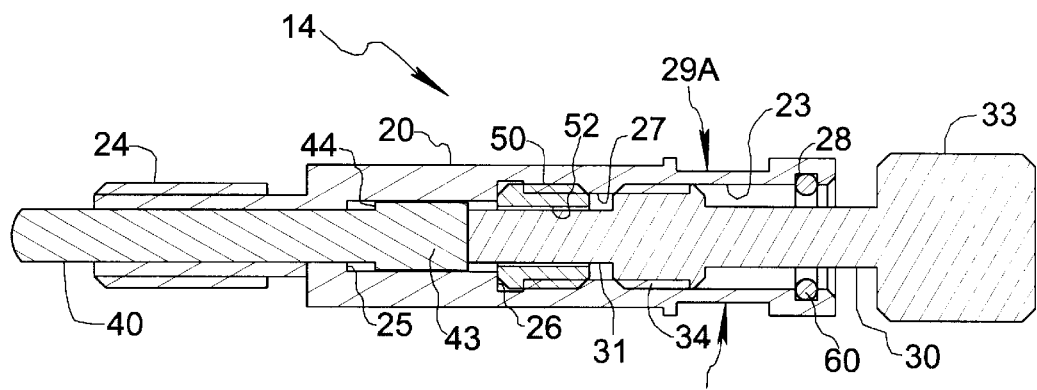
FIG. 4 is an enlarged cross-sectional view of the anti-theft device.

Referring now to FIGS. 2 through 4, anti-theft device 14 generally comprises a housing 20, a driver 30, a plunger 40, a retainer 50, and a snap ring 60. The various component parts of device 14 are preferably formed of stainless steel, however other materials may be substituted for stainless steel.

Housing 20 is an elongated cylindrical member having a leading end 21, a trailing end 22 opposite the leading end, and an axial passageway 23 extending the length of the housing from leading end 21 to trailing end 22. Housing 20 includes an externally threaded portion 24 near leading end 21. Threaded portion 24 is preferably specified as an M4×0.7 metric thread, however other thread specifications may be warranted depending on the particular application for which device 14 is employed. Other features of housing 20 include a first internal step 25, a second internal step 26 between first internal step 25 and trailing end 22, an internally threaded portion 27 extending from a location proximate second internal step 26 to a location closer to, but spaced from, trailing end 22, and an internal circumferential groove 28 proximate trailing end 22. Internally threaded portion 27 is preferably tapped to provide an M4×0.7 metric thread, but other thread specifications can be used. Housing 20 is further provided with at least two diametrically opposite external flat surfaces 29A, 29B for engagement by a wrench as will be described below. A slot 19 is provided at trailing end 22 to communicate with internal groove 28.

Driver 30 is generally similar to a thumbscrew and includes an elongated stem 31 terminating at a distal abutment end 32 and an enlarged head 33 at a proximal end of stem 31. The external circumferential surface of enlarged head 33 is preferably knurled or otherwise textured to facilitate the application of torque to driver 30 by hand, as in the nature of a thumbscrew. Driver 30 also includes an externally threaded portion 34 along stem 31 at a generally intermediate region between abutment end 32 and enlarged head 33. Externally threaded portion 34 is of an enlarged diameter relative to the remainder of stem 31 and is sized and threaded for mating with internally threaded portion 27 of housing 20.

Plunger 40 is in the form of a cylindrical pin having a distal locking end 41, a proximal abutment end 42 opposite the locking end, and a drive head 43 adjacent abutment end 42. As can be seen, drive head 43 is enlarged with respect to the remainder of plunger 40 to provide a step 44 on the plunger body.

Retainer 50 is in the form of a cylindrical plug that is externally threaded and sized for mating with internally threaded portion 27 of housing 20. Retainer 50 includes an axial through-hole 52 sized to slidably accommodate stem 31 of driver 30 but not drive head 43 of plunger 40. A slot 54 is provided at a proximal end of retainer 50 for accepting a screwdriver.

Snap ring 60 is a generally C-shaped spring element designed for installation within internal groove 28 in housing 20.

The preferred manner of assembling the various components of anti-theft device 14 will now be described. To begin, plunger 40 is inserted, locking end 41 first, into housing passageway 23 through trailing end 22. Next, retainer 50 is inserted into housing passageway 23 through trailing end 22 such that slot 52 can be accessed through the trailing end of the housing. A screwdriver or similar device is then inserted into passageway 23 through trailing end 22 to engage slot 54, whereby retainer 50 can be rotated to threadably advance the retainer until its distal end engages second step internal step 26. Driver 30 is then inserted, abutment end 32 first, into housing passageway 23 through trailing end 22. Finally, snap ring 60 is compressed, positioned at internal circumferential groove 28, and allowed to snap into place in groove 28 under spring forces.

Figure 5:
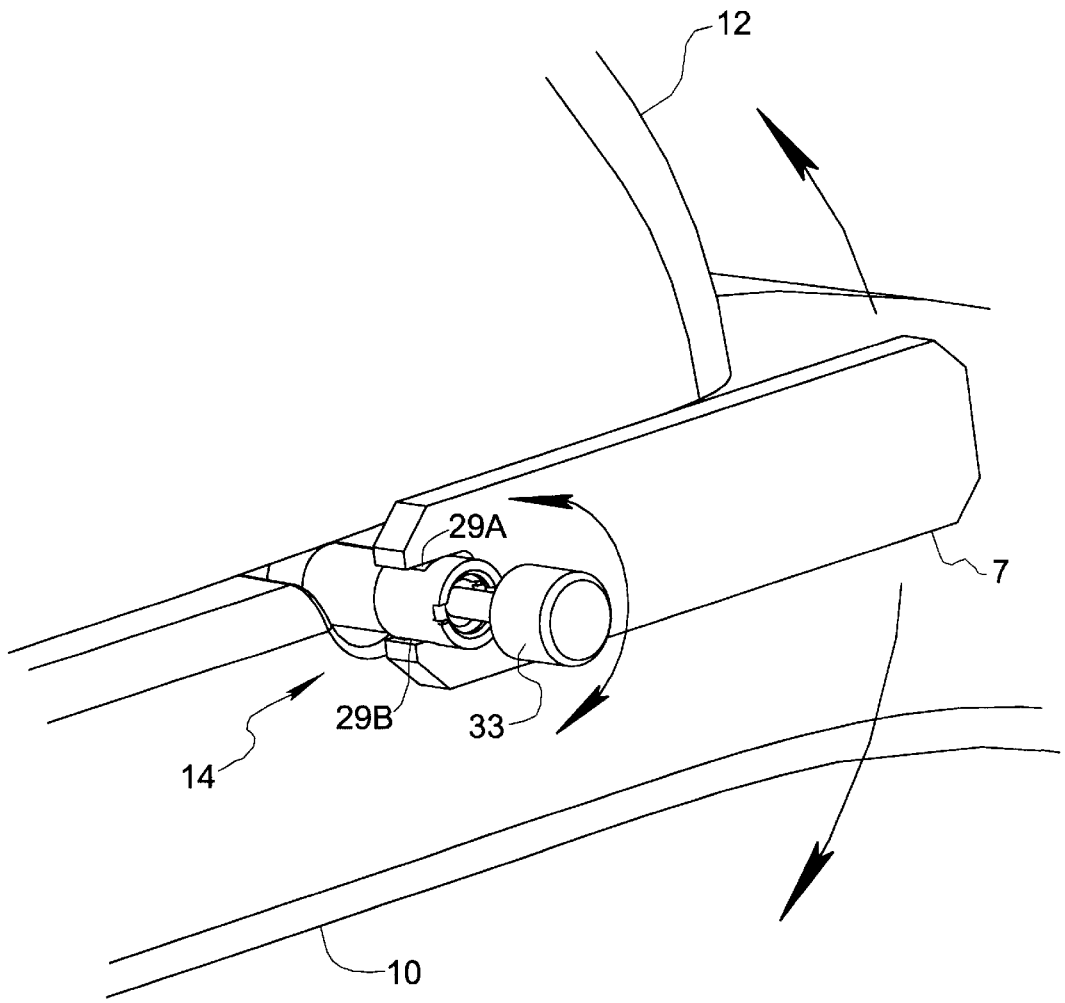
FIG. 5 is a perspective view illustrating use of a tool to install and remove the anti-theft device of the present invention.
Figure 6:
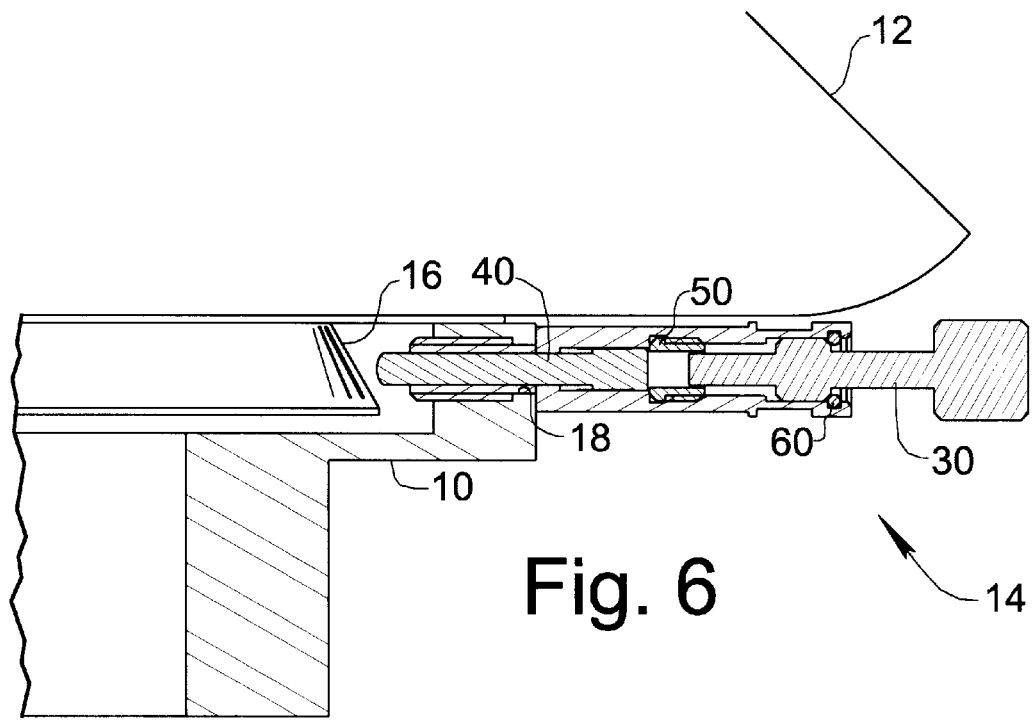
FIG. 6 is a partially sectioned view showing the anti-theft device of the present invention in its partial release state with respect to a removable body part mounted on a microscope stand.
Figure 7:
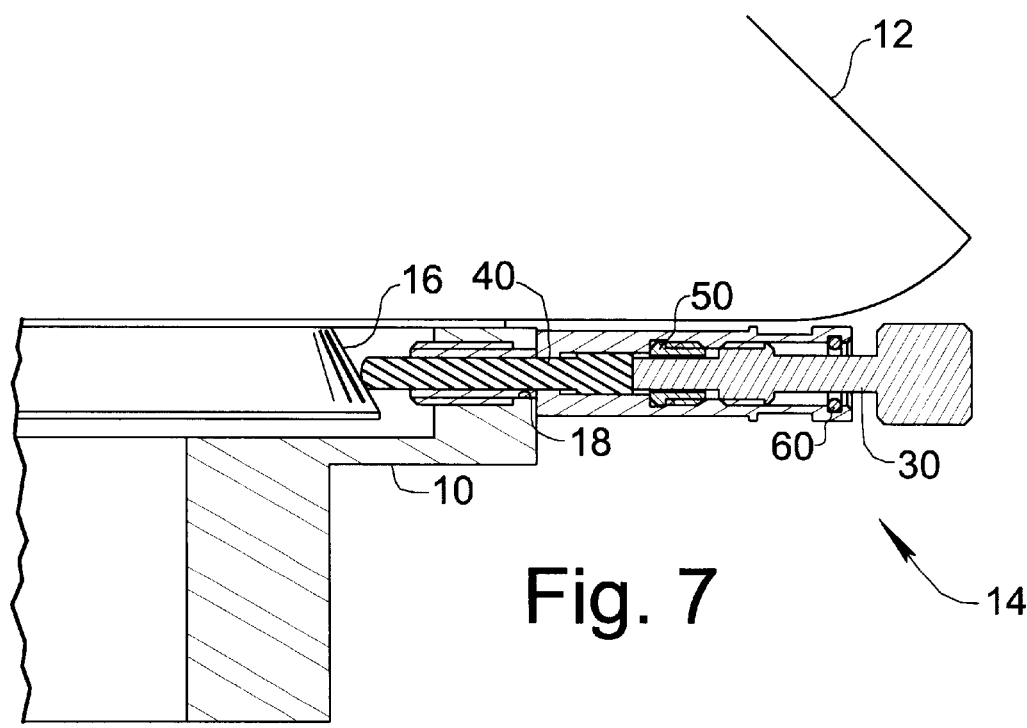
FIG. 7 is a view similar to that of FIG. 6, however the anti-theft device is shown in its locking state with respect to the removable body part.

The assembled anti-theft device 14 operates as depicted in FIGS. 5–7, which show device 14 installed to prevent removal of binocular viewing unit 12 from an annular dovetail guide 16 in microscope stand 10 while nevertheless enabling binocular viewing unit 12 to be rotatably adjusted as allowed by annular dovetail guide and fixed at a selected rotational position. Device 14 is installed after binocular viewing unit 12 is mounted in dovetail guide 16 by threading externally threaded portion 24 into a tapped hole 18 provided in the stand 10 at the dovetail guide 16. As mentioned in the Background herein, such a tapped hole 18 has heretofore been provided and intended for receipt of a simple thumbscrew of the prior art. Housing 20 is then tightened by arranging an open-ended wrench 7 to engage flats 29A, 29B and applying sufficient torque to prevent the housing from being loosened by hand without the use of wrench 7.

FIG. 6 shows device 14 in its partial release state, wherein the enlarged externally threaded portion 34 of driver 30 is out of threaded engagement with internally threaded portion 24 of housing 20. In this state, driver 30 rotates freely but is held captive by housing 20 because snap ring 60 prevents threaded portion 34 from being withdrawn. Also, driver 30 is in a non-driving position removed from operative connection with plunger 40 such that the plunger is free to slide in a retraction direction (to the right in FIG. 6). Travel of plunger 40 in the retraction direction is limited by abutment of its abutment end 42 against retainer 50. Accordingly, plunger 40 does not prevent the binocular viewing unit 12 from being rotated about a central access of annular dovetail guide 16, but always protrudes into the dovetail guide enough to prevent the binocular viewing unit from being lifted out of the dovetail guide and removed from the microscope stand 10.

FIG. 7 shows device 14 in its locking state, wherein the enlarged externally threaded portion 34 of driver 30 is mated in threaded engagement with internally threaded portion 24 to allow the driver to be threadably advanced to a driving position wherein the driver is operatively connected to plunger 40. In the embodiment described herein, operative connection between driver 30 and plunger 40 is by direct engagement of abutment end 32 of the driver with abutment end 42 of the plunger, as shown. The driver is threadably advanced until plunger 34 is forced into locking engagement with the dovetail 13 of binocular viewing unit 12, thereby locking the binocular viewing unit in position.

Anti-theft device 14 is operable only by a tool, for example wrench 7, to a full release state wherein binocular viewing unit 12 is freely removable from the dovetail guide for exchange, service, maintenance, or the like. In accordance with the present embodiment wrench 7 is used to unscrew housing 20 from tapped hole 18 until plunger 40 no longer prevents binocular viewing unit 12 from being lifted out of dovetail guide 16.

It is noted here that although the present invention has been described in connection with an annular dovetail guide, the invention also finds utility in connection with other types of guides, including linear dovetail guides. Similarly, the device of the present invention is not limited in use to securing microscope parts.

It will be appreciated from the foregoing description that antitheft device provides an inexpensive measure of protection against theft of removable microscope parts. Moreover, the device of the present invention solves the problem of the loss of thumbscrews because driver 30 is captively received by housing 20.

What is claimed is:

1. An anti-theft device comprising:
   a housing having a leading end, a trailing end opposite said leading end, and a passageway extending through said housing from said leading end to said trailing end;
   a plunger at least partially received by said passageway, said plunger being movable relative to said housing in an extension direction to cause a portion of said plunger to extend out of said housing through said leading end and in a retraction direction opposite said extension direction;
   a driver partially received by said passageway through said trailing end, said driver being adjustable between a driving position wherein said driver is operatively engaged with said plunger to prevent motion of said plunger in said retraction direction and a non-driving position wherein said driver is not operatively engaged with said plunger to allow motion of said plunger in said retraction direction, and
   means for limiting travel of said plunger in said retraction direction when said driver is not operatively engaged with said plunger.

2. The anti-theft device according to claim 1, wherein said housing includes an externally threaded portion proximate said leading end and means proximate said trailing end for facilitating the application of torque to said housing.

3. The anti-theft device according to claim 2, wherein said means for facilitating the application of torque to said housing comprises a plurality of flat surfaces arranged for accepting a wrench.

4. The anti-theft device according to claim 1, wherein said driver is operably connected to said plunger by directly engaging said plunger.

5. The anti-theft device according to claim 1, wherein said driver is threadably adjustable relative to said housing.

6. The anti-theft device according to claim 5, wherein said driver includes an enlarged head outside of said housing for enabling a user to apply torque to said driver by hand.

7. The anti-theft device according to claim 5, wherein said passageway includes an internally threaded portion and said driver includes an enlarged externally threaded portion mating with said internally threaded portion of said passageway.

8. The anti-theft device according to claim 7, wherein said enlarged externally threaded portion of said driver is removed from threaded mating with said internally threaded portion of said passageway when said driver is in said non-driving position.

9. The anti-theft device according to claim 7, wherein said passageway is constricted near said trailing end to prevent complete withdrawal of said enlarged externally threaded portion of said driver from said passageway.

10. The anti-theft device according to claim 9, wherein said passageway is constricted near said trailing end by a snap ring held within an internal groove in said housing.

11. The anti-theft device according to claim 1, wherein said plunger includes an enlarged drive head within said passageway, and said housing includes an internal step for engagement with said drive head to limit travel of said plunger in said extension direction.

12. The anti-theft device according to claim 11, wherein said means for limiting travel of said plunger in said retraction direction comprises a retainer within said passageway.

13. The anti-theft device according to claim 12, wherein said retainer is threadably installed in said passageway.

14. The anti-theft device according to claim 12, wherein said retainer engages said drive head of said plunger to limit travel of said plunger in said retraction direction.

15. A microscope comprising a stand, a removable body part connected to said stand, guide means associated with said stand for receiving said removable body part and allowing adjustment positioning of said removable body part relative to said stand in a defined manner, and
   an anti-theft device operable without a tool between a locking state wherein said device fixes said removable body part relative to said stand at a chosen adjustment position allowed by said guide means and a partial release state wherein said device permits said removable body part to be adjusted as allowed by said guide means and prevents said removable body part from being removed from said guide means; said anti-theft device being operable only by a tool to a full release state wherein said removable body part is freely removable from said guide means.

16. The microscope according to claim 15, wherein said guide means is a dovetail guide.

17. The microscope according to claim 16, wherein said dovetail guide is an annular dovetail guide.

18. The microscope according to claim 15, wherein said stand includes a tapped hole in said guide means, and said anti-theft device comprises:
   a housing threadably attached to said stand by mating with said tapped hole, said housing being tightened and loosened with said tool;
   a plunger carried by said housing; and
   a driver carried by said housing and adjustable by hand to a driving position wherein said driver maintains said plunger in engagement with said removable body part to define said locking state and to a non-driving position wherein said plunger is freely movable within a limited range to define said partial release state.

19. The microscope according to claim 18, wherein said driver is held captive by said housing.

* * * * *